(12) United States Patent
Wang (10) Patent No.: US 8,207,738 B2
(45) Date of Patent: Jun. 26, 2012

(54) NON-PLANAR ANTENNAE FOR DIRECTIONAL RESISTIVITY LOGGING

(75) Inventor: Tsili Wang, Katy, TX (US)

(73) Assignee: Smith International Inc., Houston, TX (US)

( * ) Notice: Subject to any disclaimer, the term of this patent is extended or adjusted under 35 U.S.C. 154(b) by 586 days.

(21) Appl. No.: 12/409,655

(22) Filed: Mar. 24, 2009

(65) Prior Publication Data

US 2010/0244841 A1 Sep. 30, 2010

(51) Int. Cl.
*G01V 3/00* (2006.01)
(52) U.S. Cl. ........................................................ 324/333
(58) Field of Classification Search .................. None
See application file for complete search history.

(56) References Cited

U.S. PATENT DOCUMENTS

| | | | |
|---|---|---|---|
| 5,045,795 A | 9/1991 | Gianzero et al. |
| 6,181,138 B1 | 1/2001 | Hagiwara et al. |
| 6,297,639 B1 | 10/2001 | Clark et al. |
| 6,476,609 B1 | 11/2002 | Bittar |
| 6,509,738 B1 | 1/2003 | Minerbo et al. |
| 6,556,015 B1 | 4/2003 | Omeragic et al. |
| 6,566,881 B2 | 5/2003 | Omeragic et al. |
| 6,573,722 B2 | 6/2003 | Rosthal et al. |
| 6,777,940 B2 * | 8/2004 | Macune .......................... 324/338 |
| 6,819,110 B2 | 11/2004 | Omeragic et al. |
| 6,836,218 B2 | 12/2004 | Frey et al. |
| 6,903,553 B2 | 6/2005 | Itskovich et al. |
| 6,911,824 B2 | 6/2005 | Bittar |
| 6,937,022 B2 | 8/2005 | Itskovich et al. |
| 6,969,994 B2 | 11/2005 | Minerbo et al. |
| 6,998,844 B2 | 2/2006 | Omeragic et al. |
| 7,003,401 B2 | 2/2006 | Haugland |
| 7,019,528 B2 | 3/2006 | Bittar |
| 7,038,457 B2 | 5/2006 | Chen et al. |
| 7,057,392 B2 | 6/2006 | Wang et al. |
| 7,138,803 B2 | 11/2006 | Bittar |
| 7,265,552 B2 | 9/2007 | Bittar |
| 7,269,515 B2 | 9/2007 | Tabarovsky et al. |
| 7,274,991 B2 | 9/2007 | Tabarovsky et al. |
| 7,286,091 B2 | 10/2007 | Chen et al. |
| 7,345,487 B2 | 3/2008 | Bittar et al. |
| 7,353,613 B2 | 4/2008 | Bartel et al. |

(Continued)

OTHER PUBLICATIONS

International Search Report and Written Opinion dated Nov. 1, 2010 for corresponding PCT application No. PCT/US2010/028443 filed Mar. 24, 2010.

*Primary Examiner* — Jermele M Hollington
(74) *Attorney, Agent, or Firm* — Darla P. Fonseca; Brigitte Echols; Charlotte Rutherford (57) ABSTRACT

A downhole measurement tool includes at least one non-planar antenna configured for transmitting and/or receiving electromagnetic radiation. The non-planar antenna includes at least one non-planar loop of antenna wire deployed about a tool body. In one exemplary embodiment, the non-planar antenna may be thought of as being bi-planar in that it includes first and second sections defining first and second intercepting geometric planes. In another exemplary embodiment, the axial separation between the non-planar loop of antenna wire and a circular centerline of the antenna varies substantially sinusoidally with respect to an azimuth angle about the circumference of the tool. Exemplary non-planar antennae in accordance with the invention may be advantageously configured to transceive substantially pure x-, y-, and z-mode radiation.

36 Claims, 6 Drawing Sheets

U.S. PATENT DOCUMENTS

| | | | |
|---|---|---|---|
| 7,385,400 | B2 | 6/2008 | Moore |
| 7,414,407 | B2 | 8/2008 | Wang et al. |
| 7,436,184 | B2 | 10/2008 | Moore |
| 7,594,434 | B2* | 9/2009 | Dagenais et al. .......... 73/152.54 |
| 7,990,153 | B2* | 8/2011 | Streinz et al. ................ 324/338 |
| 8,089,268 | B2* | 1/2012 | Wang .......................... 324/338 |
| 2003/0184303 | A1* | 10/2003 | Homan et al. ................ 324/339 |
| 2005/0264293 | A1* | 12/2005 | Gao et al. ..................... 324/326 |
| 2008/0068022 | A1 | 3/2008 | Peter et al. |
| 2008/0074336 | A1 | 3/2008 | Signorelli et al. |
| 2008/0078580 | A1 | 4/2008 | Bittar |
| 2008/0128126 | A1* | 6/2008 | Dagenais et al. .......... 73/152.54 |
| 2008/0158082 | A1 | 7/2008 | Wang et al. |
| 2008/0246486 | A1 | 10/2008 | Forgang et al. |
| 2010/0156424 | A1* | 6/2010 | Bittar et al. .................. 324/339 |
| 2010/0283470 | A1* | 11/2010 | Streinz et al. ................ 324/338 |
| 2010/0286916 | A1* | 11/2010 | Wang ............................... 702/9 |
| 2011/0074428 | A1* | 3/2011 | Wang ............................ 324/339 |

* cited by examiner

NON-PLANAR ANTENNAE FOR DIRECTIONAL RESISTIVITY LOGGING

RELATED APPLICATIONS

None.

FIELD OF THE INVENTION

The present invention relates generally to downhole measurement tools utilized for measuring electromagnetic properties of a subterranean borehole. More particularly, embodiments of this invention relate to non-planar antennae and logging tools utilizing such antennae for making directional resistivity measurements of a subterranean formation.

BACKGROUND OF THE INVENTION

The use of electrical measurements in prior art downhole applications, such as logging while drilling (LWD), measurement while drilling (MWD), and wireline logging applications is well known. Such techniques may be utilized to determine a subterranean formation resistivity, which, along with formation porosity measurements, is often used to indicate the presence of hydrocarbons in the formation. For example, it is known in the art that porous formations having a high electrical resistivity often contain hydrocarbons, such as crude oil, while porous formations having a low electrical resistivity are often water saturated. It will be appreciated that the terms resistivity and conductivity, though reciprocal, are often used interchangeably in the art. Mention of one or the other herein is for convenience of description, and is not intended in a limiting sense.

Advances in directional drilling techniques enable the path of a subterranean borehole to be precisely routed in a manner that maximizes oil production. Measurement-while drilling (MWD) and logging-while-drilling (LWD) techniques provide, in substantially real-time, information about a subterranean formation as a borehole is drilled. Such information may be utilized in making steering decisions for subsequent drilling of the borehole. For example, an essentially horizontal section of a borehole may be routed through a thin oil bearing layer. Due to the dips and faults that may occur in the various layers that make up the strata, the drill bit may sporadically exit the thin oil-bearing layer and enter nonproductive zones during drilling. In attempting to steer the drill bit back into the oil-bearing layer, a drilling operator typically needs to know in which direction to turn the drill bit (e.g., up, down, left, or right). In order to make correct steering decisions, information about the strata, such as the dip and strike angles of the boundaries of the oil-bearing layer, is generally useful. Such information may be obtained from azimuthally sensitive measurements of electrical properties (e.g., resistivity) of the surrounding subterranean formation.

Azimuthally sensitive MWD/LWD resistivity tools are disclosed in the prior art and are commonly referred to as directional resistivity tools. While directional resistivity tools have been used commercially, there remains a need for further improvement, and in particular there remains a need for improved antennae for use in directional resistivity logging applications.

SUMMARY OF THE INVENTION

Aspects of the present invention are intended to address the above described need for improved directional resistivity tools. In one aspect the invention includes a downhole measurement tool having at least one non-planar antenna. The non-planar antenna includes at least one non-planar loop of antenna wire deployed about the tool body. Exemplary non-planar antennae may be configured to transceive one or more substantially pure modes of electromagnetic radiation (i.e., x-, y-, and/or z-mode radiation) as well as various mixed modes. In one exemplary embodiment, the non-planar antenna may be thought of as being bi-planar in that it includes first and second sections defining first and second intercepting geometric planes. In another exemplary embodiment, the axial separation between the non-planar loop of antenna wire and a circular centerline of the antenna varies substantially sinusoidally with respect to the azimuth angle about the circumference of the tool.

Exemplary embodiments of the present invention may advantageously provide several technical advantages. For example, a non-planar antenna in accordance with the invention may be advantageously configured to transceive substantially pure x-, y-, and z-mode radiation. The non-planar antenna may therefore be utilized to make both directional and non-directional resistivity measurements. The use of a single antenna for making both directional and non-directional resistivity measurements tends to conserve space on the tool and may enable measurements to be made closer to the bit in MWD/LWD operations.

Exemplary antenna embodiments of the present invention may be advantageously collocated in that they enable the transmission and/or reception of multiple modes (e.g., the x-, y-, and z-modes) of electromagnetic radiation from a single axial location on the tool. Moreover, multiple modes of electromagnetic radiation may be transmitted and/or received by an antenna having a single circumferential groove (recess) about the tool body. This feature advantageously reduces the number of required antenna grooves and therefore tends to enable high tool strengths to be maintained.

In one aspect the present invention includes a downhole tool. The tool includes a non-planar antenna deployed on a downhole tool body. The antenna includes at least one non-planar loop of antenna wire deployed about the tool body and at least one antenna circuit electrically connected to the antenna wire.

In another aspect, this invention includes a downhole tool. The tool includes a non-planar antenna deployed on a downhole tool body. The antenna includes at least one non-planar loop of antenna wire deployed about the tool body and at least one antenna circuit electrically connected to the antenna wire. The loop of antenna wire includes first and second sections defining corresponding first and second geometric planes.

In still another aspect, the present invention includes a downhole tool. The tool includes a non-planar antenna deployed on a downhole tool body. The antenna includes at least one non-planar loop of antenna wire deployed about the tool body and at least one antenna circuit electrically connected to the antenna wire. The loop of antenna wire is axially symmetric about a circular centerline of the antenna.

In yet another aspect, this invention includes a downhole tool. The tool includes a non-planar antenna deployed on a downhole tool body. The antenna includes first and second antenna wires deployed about the tool body in a single non-planar, circumferential recess formed in the tool body. The first and second antenna wires are electrically connected to corresponding first and second antenna circuits such that the first antenna wire is configured to transceive z-mode electromagnetic radiation and the second antenna wire is configured to transceive x-mode electromagnetic radiation. In one exemplary embodiment, the non-planar antenna includes a third antenna wire deployed about the tool body in the non-planar recess. The third antenna wire is electrically connected with a corresponding third antenna circuit such that the third antenna wire is configured to transceive y-mode electromagnetic radiation.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1A:
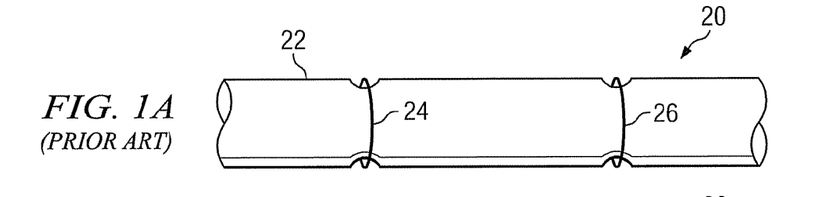
FIGS. 1A through 1C depict prior art antenna embodiments.
Figure 1B:
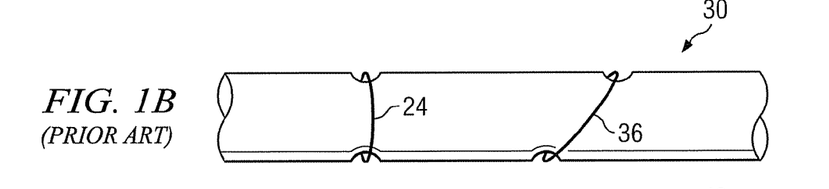
Figure 1C:
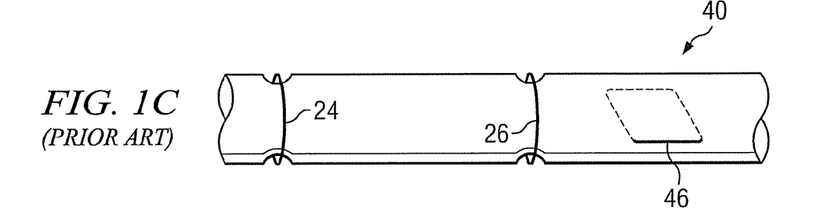

FIGS. 1A, 1B, and 1C (collectively FIG. 1) depict three prior art resistivity measurement tools 20, 30, and 40, respectively. These tools are commonly referred to in the art as electromagnetic induction logging tools or resistivity tools. These terms will be used synonymously herein. In use, a time varying electric current (an alternating current) in one or more of the transmitting antennae produces a time varying magnetic field in the formation which in turn induces electrical currents (eddy currents) in the conductive formation. The eddy currents further produce secondary magnetic fields which can produce a voltage in one or more receiving antennae. These measured voltages can be processed to estimate formation resistivity and dielectric constant, which as described above, can be related to the hydrocarbon bearing potential of the formation.

Turning first to FIG. 1A, one exemplary embodiment of a commercial measurement tool 20 for use in making non-directional resistivity measurements is depicted. The embodiment depicted includes a receiving antenna 26 (a receiver) axially offset from a transmitting antenna 24 (a transmitter). Those of skill in the art will realize that commercial tool embodiments typically have multiple transmitters and receivers spaced along the axis of the tool so as to enable resistivity measurements to be made at multiple depths of investigation. Transmission at multiple perturbation frequencies (e.g., 0.5 and 2.0 MHz) is also known in the art. Formation resistivity is often calculated from the phase shift and attenuation (change in amplitude) between voltage signals received at first and second receiving antennae.

FIG. 1A further depicts an embodiment in which the transmitting and receiving antennae 24 and 26 are deployed substantially coaxially with one another and with the tool body 22 (such that the magnetic dipoles of the antennae are coincident with the longitudinal axis of the tool 20). Antennae 24 and 26 are referred to herein as coaxial antennae since they are substantially coaxial with the tool body. In this configuration, the antennae induce (or detect) eddy currents in the formation in loops about the circumference of the tool and in planes orthogonal to the longitudinal axis thereof. Such conventional logging tools therefore provide no directional (azimuthal) sensitivity.

Turning now to FIG. 1B, electromagnetic resistivity tools having one or more tilted antennae are also known in the art. In the exemplary embodiment depicted, measurement tool 30 includes a tilted receiving antenna 36 axially offset from transmitting antenna 24. As stated above, commercial tools typically employ multiple spaced transmitting and receiving antennae. Tilted antennae have their magnetic dipole axis oriented away from the longitudinal axis of the tool (typically at an angle of 45 degrees as depicted) and therefore induce (or detect) eddy currents that flow in planes that are non-orthogonal with respect to the tool axis. Tilted antennae may also be thought of as transmitting and/or receiving a mixed mode electromagnetic wave (i.e., an electromagnetic wave having both longitudinal and transverse components). Tools employing multiple tilted transmitting and/or receiving antennae are also known. Moreover, tool embodiments having first and second collocated tilted antenna are further known. In such embodiments, the first and second collocated antennae may be deployed orthogonally to one another with magnetic dipole axes oriented at 45 and −45 degrees with respect to the longitudinal axis of the tool (see, for example, U.S. Pat. Nos. 7,202,670 and 7,382,135).

With reference now to FIG. 1C, electromagnetic resistivity tools having transverse antennae are also known in the art. In the exemplary embodiment shown, measurement tool 40 employs first and second longitudinally spaced receiving antennae 26 and 46 axially offset from a transmitting antenna 24. Receiving antenna 46 is configured such that its antenna plane is parallel to the longitudinal axis of the tool to produce a dipole moment that is transverse to the longitudinal axis of the tool (and to antennae 24 and 26). Antennae 26 and 46 may be axially spaced, as depicted, or collocated. The use of collocated antennae to transmit and/or receive a mixed mode electromagnetic wave is also known. Tools utilizing orthogonal (spaced or collocated) transverse antennae (i.e., x- and y-mode) are also known.

Resistivity tools employing tilted antennae or transverse antennae have been utilized commercially to make directional resistivity measurements. Notwithstanding, there remains a need in the industry for an improved directional resistivity tool employing improved antennae. For example, tilted antennae transmit and/or receive (transceive) mixed mode waves which are not easily separated into their axial and transverse components. Conventional transverse antennae require multiple sets of slots (e.g. axial and/or circumferential) to be formed in the tool body through which multiple modes of the electromagnetic wave may be transceived. Such slots can compromise the structural integrity of the tool, especially in tool embodiments employing collocated antennae in which numerous multidirectional slots are often employed. Therefore, there exists a need for improved resistivity antennae and downhole measurement tools employing such antennae.

It will be understood that as used herein the term "transceive" means to transmit and/or receive. When used as a verb, e.g., transceive or "transceiving", reference is made to the actions of transmitting and/or receiving an electromagnetic wave. When used as a noun, e.g., "transceiver", reference is made to a transmitter and/or a receiver. When used adjectivally, e.g., a "transceiver" circuit, reference is made to transmitter and/or receiver functionality. For example, a transceiver circuit refers to a circuit that provides transmitter and/or receiver functionality to an antenna. Likewise, a transceiver antenna refers to an antenna that functions as a transmitter and/or as a receiver. It will be further understood that the term transceive (or transceiver) is used for efficiency of exposition. The term transceiver may refer to either a transmitter or a receiver. It may also refer to a device configured to function as both transmitter and receiver. Likewise, the act of transceiving refers to either transmitting or receiving. It may also refer to simultaneous transmission and reception. The invention is not limited in these regards. Non-planar antennae in accordance with the invention may be configured to function as transmitters (alone), receivers (alone), or both transmitters and receivers (either sequentially or simultaneously).

Referring now to FIGS. 2 through 8, exemplary embodiments of the present invention are depicted. With respect to FIGS. 2 through 8, it will be understood that features or aspects of the embodiments illustrated may be shown from various views. Where such features or aspects are common to particular views, they are labeled using the same reference numeral. Thus, a feature or aspect labeled with a particular reference numeral on one view in FIGS. 2 through 8 may be described herein with respect to that reference numeral shown on other views.

Figure 2:
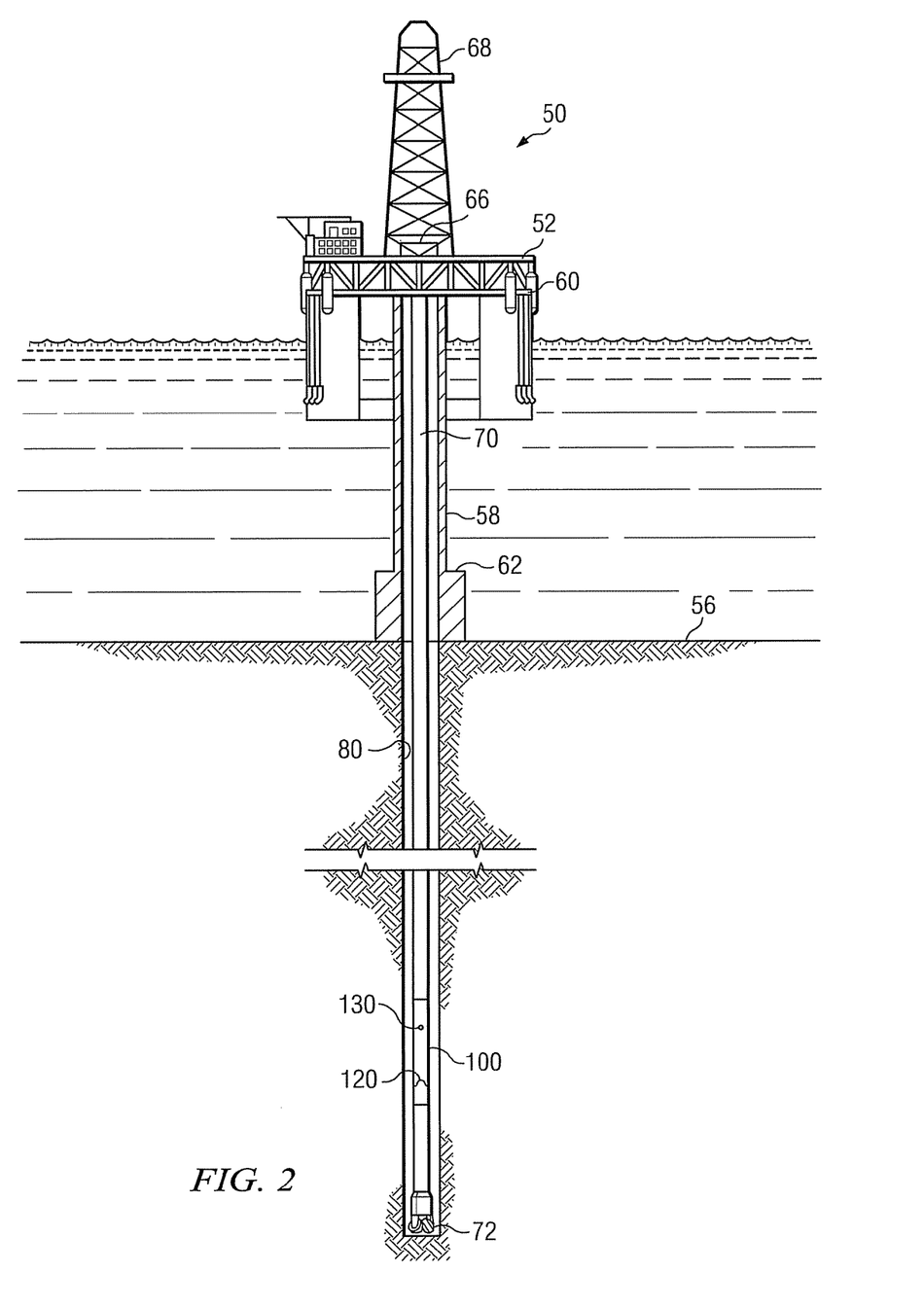
FIG. 2 depicts a drilling rig on which exemplary embodiments of the present invention may be deployed.
Figure 3:
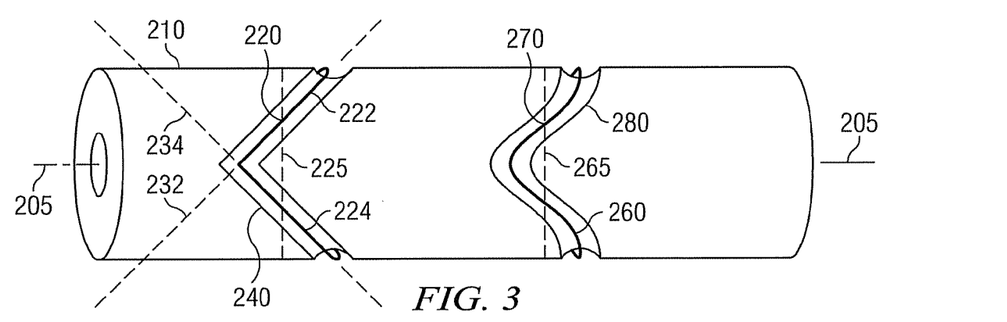
FIG. 3 depicts first and second non-planar antenna embodiments in accordance with the present invention.

FIG. 2 depicts one exemplary embodiment of a logging while drilling tool 100 in use in an offshore oil or gas drilling assembly, generally denoted 50. In FIG. 2, a semisubmersible drilling platform 52 is positioned over an oil or gas formation (not shown) disposed below the sea floor 56. A subsea conduit 58 extends from deck 60 of platform 52 to a wellhead installation 62. The platform may include a derrick 66 and a hoisting apparatus 68 for raising and lowering the drill string 70, which, as shown, extends into borehole 80 and includes a drill bit 72 and a resistivity measurement tool 100. Embodiments of measurement tool 100 include at least one non-planar antenna 120 (also referred to herein as a non-planar transceiver) deployed about the tool body 110 (FIG. 3A). Exemplary embodiments of measurement tool 100 may further optionally include one or more conventional antennae, for example, including coaxial, transverse, and/or tilted antennae. Exemplary embodiments of the invention often further include an azimuth sensor 130 (also referred to as a tool face sensor). Suitable azimuth sensors may include substantially any sensor that is sensitive to its azimuth (tool face) on the tool 100 (e.g., relative to high side, low side, left side, right side, etc.), such as one or more accelerometers, magnetometers, and/or gyroscopes. Drill string 30 may further include a downhole drill motor, a mud pulse telemetry system, and one or more of numerous other sensors, such as a nuclear logging instrument, for sensing downhole characteristics of the borehole and the surrounding formation.

It will be understood by those of ordinary skill in the art that the deployment illustrated on FIG. 2 is merely exemplary for purposes of describing the invention set forth herein. It will be further understood that the measurement tool 100 of the present invention is not limited to use with a semisubmersible platform 52 as illustrated on FIG. 2. Measurement tool 100 is equally well suited for use with any kind of subterranean drilling operation, either offshore or onshore. While measurement tool 100 is shown coupled with a drill string on FIG. 2, it will also be understood that the invention is not limited to measurement while drilling (MWD) and/or logging while drilling (LWD) embodiments. Measurement tools in accordance with the present invention, including at least one non-planar antenna, may also be configured for use in wireline applications.

Referring now to FIG. 3, exemplary antennae embodiments of the present invention are depicted. FIG. 3 depicts first and second non-planar antennae 220 and 260 deployed on a substantially cylindrical tool body 210. In the exemplary embodiment depicted, the antennae are deployed in corresponding recesses 240 and 280 formed in an outer surface of the tool body 210. In MWD/LWD embodiments, the tool body 210 is a drill collar configured for coupling with a drill string (e.g., drill string 70 depicted on FIG. 2) and therefore may optionally include conventional threaded pin and box ends (not shown). While FIG. 3 depicts a tool body 210 having first and second axially spaced non-planar antennae deployed thereon, it will be appreciated that the invention is not limited in this regard. Measurement tools in accordance with the invention may include substantially any number (one or more) of non-planar antennae. First and second antennae are depicted on FIG. 3 with the sole purpose of more efficiently describing the invention.

Antennae embodiments 220 and 260 are similar to conventional antennae in that they include an antenna wire deployed in a recess on the tool body. The wire may be wound one or more revolutions about the drill collar (FIG. 3 shows a configuration with a single winding). The wire may further be hermetically sealed within the recess to protect it from the external environment, but is nonetheless configured to transmit and/or receive an electromagnetic wave to or from the external environment. The opposing ends of the antenna wire form first and second terminals that may be electrically connected to a transceiver circuit (not shown). Receiver embodiments are configured to respond to an electromagnetic wave by generating a pick-up signal in the form of a voltage differential across the first and second terminals that is indicative of various attributes of the wave, such as the relative amplitude and phase thereof. Transmitter embodiments are configured to radiate an electromagnetic wave in response to an excitation signal in the form of an alternating current applied to the terminals by a transmitter circuit. Electrical connection of the inventive antenna to transmitter and/or receiver circuitry is described in more detail below with respect to FIGS. 5A through 5C. Structural details pertaining to one exemplary embodiment of the inventive antenna are described in more detail below with respect to FIG. 8.

Antenna embodiments in accordance with the present invention (e.g., antenna embodiments 220 and 260 depicted on FIG. 3) are distinct from conventional antennae in that they are non-planar. The inventive antenna may also be thought of as being non-linear. By describing the inventive antennae as non-planar it is meant that the loop of antenna wire does not reside in a single geometric plane (i.e., in a two-dimensional plane). Thought of another way, the non-planar antenna of the present invention cannot be projected onto a straight line from any angle (hence the inventive antenna may also be thought of and referred to as being a non-linear antennae).

Figure 4:
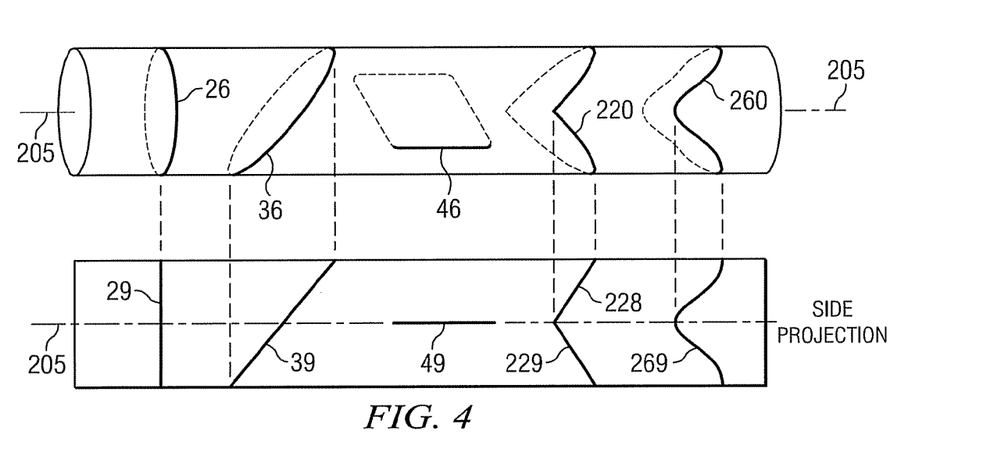
FIG. 4 contrasts the exemplary inventive antenna embodiments depicted on FIG. 3 with the prior art antenna embodiments depicted on FIGS. 1A-1C.

With continued reference to FIG. 3 and further reference now to FIG. 4, exemplary antenna embodiments 220 and 260 are contrasted with conventional antennae 26, 36, and 46 (which are also depicted on FIG. 1). As depicted on FIG. 4, conventional antennae 26, 36, and 46 are planar in that the loop (or loops) of antenna wire resides in a single plane. In particular, coaxial antenna 26 is substantially circular, tilted antenna 36 is substantially elliptical (or oval), and transverse antenna 46 is substantially rectangular (albeit typically having rounded corners). It will be readily apparent to those of ordinary skill that each of these conventional antennae 26, 36, and 46 are indeed planar (being respectively circular, oval, and rectangular). Moreover, as also depicted on FIG. 4, it will be readily apparent that when projected onto a longitudinal plane each of these conventional antennae 26, 36, and 46 form a straight line. Projection of the coaxial antenna 26 forms a line segment 29 that is orthogonal with the cylindrical axis 205. Projection of the tilted antenna 36 forms a tilted line segment 39 (e.g., at an angle of 45 degrees with respect to the cylindrical axis 205) and projection of the transverse antenna 46 forms a line segment 49 that is parallel (or coincident) with the cylindrical axis 205.

As stated above, antenna embodiments in accordance with the present invention are non-planar. With continued reference to FIGS. 3 and 4, antenna 220 may be thought of as being bi-planar in that distinct portions thereof reside on corresponding distinct first and second planes. Antenna 220 is made up of first and second semi-elliptical (or semi-oval) sections 222 and 224, each of which resides on a corresponding distinct geometric plane 232 and 234 as depicted on FIG. 3. Planes 232 and 234 are preferably orthogonal to one another (e.g., being oriented at angles of 45 and –45 degrees with respect to the tool axis 205), although the invention is not limited in this regard. As depicted on FIG. 4, projection of antenna 220 onto a longitudinal plane forms first and second non-parallel (and non-coincident) line segments 228 and 229. Antenna 220 may therefore also be thought of as being bi-linear. Notwithstanding, those of skill in the art will readily appreciate that exemplary antenna embodiment 220 is non-planar and non-linear.

Antenna 260 is also non-planar and non-linear as depicted on FIGS. 3 and 4. In antenna 260, the antenna wire loops substantially sinusoidally about the tool body 210. By looping sinusoidally it is meant that the distance between the antenna wire and circular centerline 265 varies substantially sinusoidally with azimuth angle about the circumference of the tool. This characteristic of antenna 260 is described in more detail below with respect to FIG. 7. As depicted on FIG. 4, a projection of antenna 260 onto a longitudinal plane forms a sinusoidal curve 269. In the exemplary antenna embodiment 260 depicted on FIGS. 3 and 4 the distance between the antenna wire and the circular centerline 265 traces out two complete periods of a sine wave per revolution about the circumference of the tool. It will be understood that the invention is not limited in this regard.

Figure 5A:
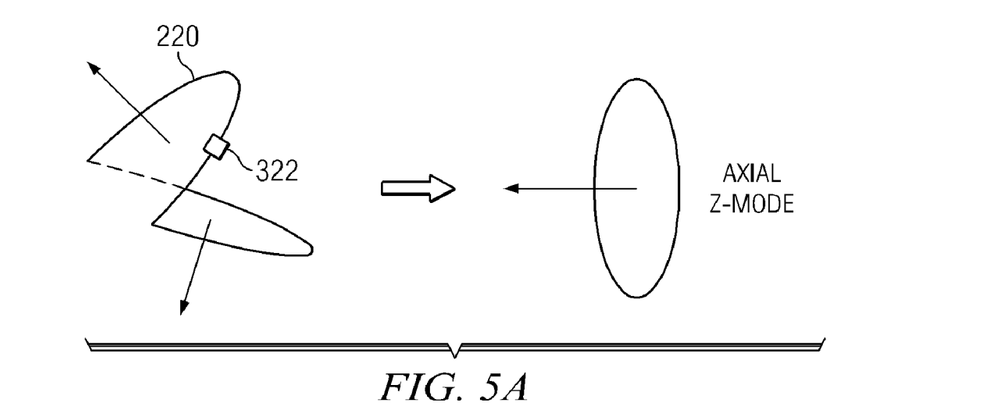
FIGS. 5A through 5C depict electrical connection configurations used to transceive substantially pure z-, x-, and y-mode radiation, respectively, utilizing exemplary antenna embodiment 220 depicted on FIG. 3.
Figure 5B:
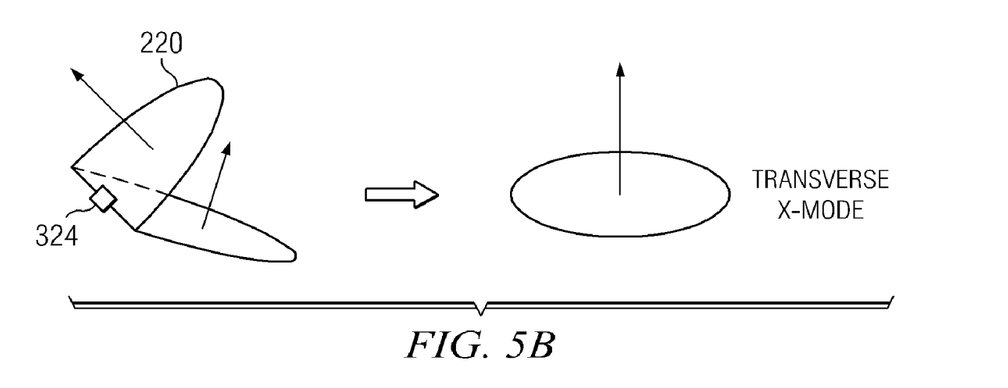
Figure 5C:
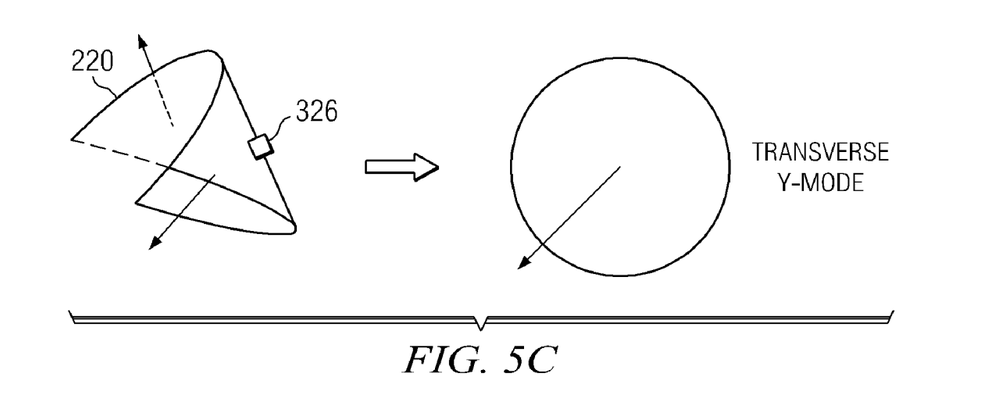
Figure 6A:
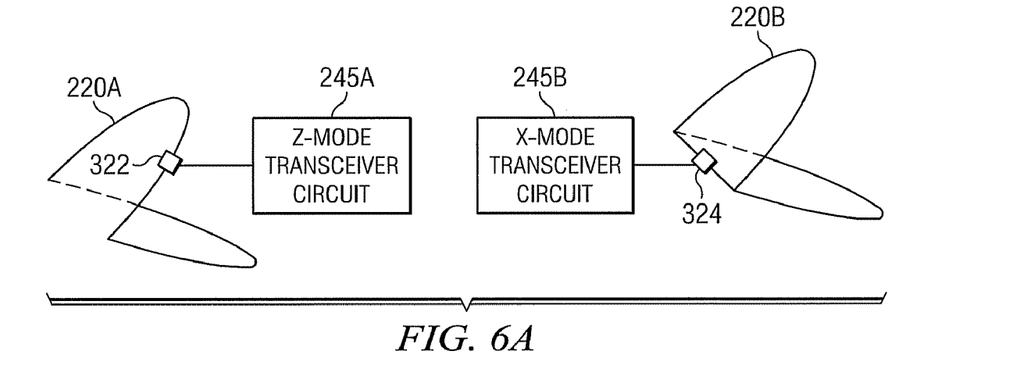
FIGS. 6A and 6B schematically depict alternative antenna embodiments in accordance with the present invention.
Figure 6B:
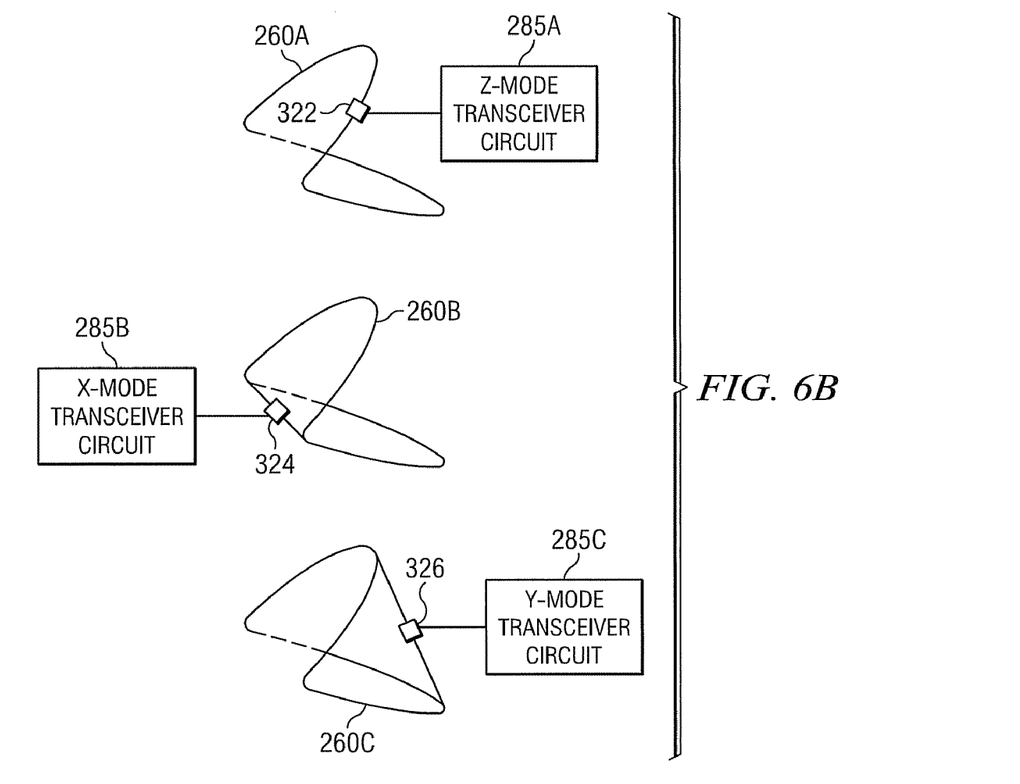

With continued reference to FIG. 3 and further reference to FIGS. 5A, 5B, and 5C (collectively FIG. 5), advantageous antenna embodiments in accordance with the present invention may be configured to selectively transceive substantially pure x-, y-, and z-mode electromagnetic radiation utilizing a single antenna wire. Certain antenna embodiments may also be configured to transceive various mixed mode radiation (e.g., including xy, xz, or yz modes). While FIG. 5 depicts exemplary antenna embodiment 220, the discussion herein pertains to both antenna 220 and antenna 260. Antennae 220 and 260 may be configured to transceive z-mode (axial mode) radiation by connecting the transceiver electronics (a circuit including transmitting and/or receiving elements) in series with the loop (or loops) of antenna wire as depicted at 322 (FIG. 5A). Antennae 220 and 260 may be configured to transceive x-mode (a first transverse mode) radiation by electrically connecting a first pair of circumferentially opposing points of the antenna wire to the transceiver electronics as depicted at 324 (FIG. 5B). Antennae 220 and 260 may be configured to transceive y-mode (a second transverse mode) radiation by electrically connecting a second pair of circumferentially opposing points of the antenna wire to the transceiver electronics as depicted at 326 (FIG. 5C). For y-mode reception and/or transmission, the second pair of opposing points is circumferentially spaced by an angle of 90 degrees with respect to the first pair (since y-mode is orthogonal to x-mode).

With continued reference to FIGS. 5A, 5B, and 5C, substantially any suitable means may be utilized to connect the antenna wire to the transceiver circuit. For example, elements 322, 324, and 326 may include conventional switching elements. In such an embodiment, element 322 is configured to switch between a closed circuit (a short circuit) and an electrical connection to the transceiver circuit. Elements 324 and 326 are configured to switch between an open circuit and an electrical connection to the transceiver circuit. To transceive z-mode radiation, element 322 electrically connects the antenna wire in series with the transceiver circuit while elements 324 and 326 are open circuit. To transceive x-mode radiation, element 324 connects the first pair of circumferentially opposing points to the transceiver circuit while element 322 is closed circuit and element 326 is open circuit. To transceive y-mode radiation, element 326 connects the second pair of circumferentially opposing points to the transceiver circuit while element 322 is closed circuit and element 324 is open circuit.

The embodiments disclosed above with respect to FIGS. 3 and 5, are described with respect to an embodiment having a single antenna wire (one wire looped one or more times about the tool body). This single antenna wire may be selectively connected with a transceiver circuit so that it is selectively configured to transceive substantially pure x-, y-, and z-mode electromagnetic radiation. It will be understood that the invention is not limited in this regard (in regard to an antenna having only one antenna wire). In certain embodiments it may be advantageous to configure a non-planar antenna with two or more antenna wires. For example, in one alternative embodiment of the invention (depicted schematically in FIG. 6A), antenna 220 may be configured to include distinct first and second antenna wires 220A and 220B deployed in recess 240 (FIG. 3). The first antenna wire 220A may be connected with a first transceiver circuit 245A in the manner described above with respect to FIG. 5A so as to transceive z-mode radiation. The second antenna wire 220B may be connected with a second transceiver circuit 245B in the manner described above with respect to FIG. 5B so as to transceive x-mode radiation. Such an exemplary embodiment may be configured to selectively transceive x- and z-mode radiation (e.g., by selectively actuating the transceiver circuits) or simultaneously transceive mixed x- and z-mode radiation (e.g., by simultaneously actuating the transceiver circuits).

In another alternative embodiment (depicted schematically on FIG. 6B), antenna 260 may be configured to include distinct first, second, and third antenna wires 260A, 260B, and 260C deployed in recess 280. The first antenna wire 260A may be connected with a first transceiver circuit 285A in the manner described above with respect to FIG. 5A so as to transceive z-mode radiation. The second antenna wire 260B may be connected with a second transceiver circuit 285B in the manner described above with respect to FIG. 5B so as to transceive x-mode radiation. The third antenna wire 260C may be connected with a third transceiver circuit 285C in the manner described above with respect to FIG. 5C so as to transceive y-mode radiation. Such an exemplary embodiment may be configured to selectively transceive substantially pure x-, y-, and z-mode radiation (e.g., by selectively actuating the transceiver circuits) or to transceive substantially any mixed modes of electromagnetic radiation. For example, to simultaneously transceive x-, y-, and z-mode radiation the transceiver circuits 285A, 285B, and 288C may be simultaneously actuated.

As described above, non-planar antennae in accordance with the invention may be configured as a transmitter and/or a receiver. Each antenna may therefore be coupled with the appropriate transceiver circuitry. Those of ordinary skill in the art will readily be able to configure suitable transceiver circuitry. A suitable transmitter circuit may include, for example, an oscillator that provides a predetermined alternating current signal and thereby enables the antenna to transmit electromagnetic signals at one or more frequencies (e.g., in the range from about 0.05 to about 2 MHz). Multiple frequencies are preferably employed to yield a greater quantity of information. Higher frequencies are known to be influenced by the dielectric properties of a formation while lower frequencies are known to penetrate deeper into a formation.

A suitable receiver circuit may include, for example, circuitry configured for receiving and amplifying signals detected by the antenna. A suitable receiver may further include an A/D converter for converting the received analog signal to a digital signal. The received signals are commonly processed downhole, at least in part, and transmitted to the surface and/or stored in downhole memory. A suitable processor processes the received signals to provide estimates of one or more formation parameters of interest, such as the resistivity and/or dielectric constant of the formation.

Figure 7:
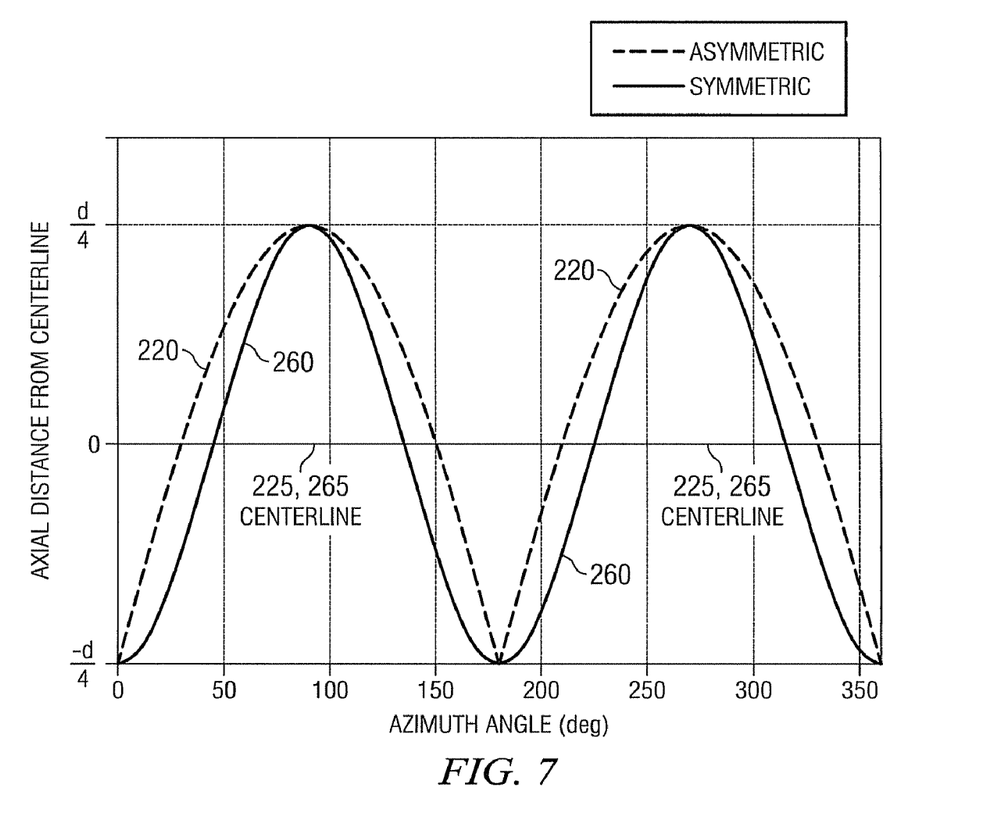
FIG. 7 depicts a plot of axial distance between the antenna wire and a circular centerline versus azimuth angle about the circumference of the tool for the antenna embodiments depicted in FIG. 3.

With reference again to FIG. 3 and further reference now to FIG. 7, exemplary non-planar antenna embodiments in accordance with the present invention may have either symmetric or asymmetric x- and y-modes depending on the particular measurement tool requirements. The invention is not limited in these regards. By symmetric it is meant that the x- and y-modes have approximately equal amplitudes. One way to achieve substantially symmetric x- and y-modes is to configure the antenna so that the antenna wire is axially symmetric with respect to a center line 265 (FIG. 3). In the exemplary embodiments depicted, antenna 260 is axially symmetric about center line 265 and therefore tends to be symmetric with respect to transmitting and/or receiving the x- and y-modes. Antenna 220 is axially asymmetric with respect to circular centerline 225 and therefore tends to be asymmetric with respect to transmitting and/or receiving the x- and y-modes.

Such antenna symmetry and asymmetry may be described in more detail with respect to FIG. 7 which depicts a plot of the axial distance between the respective antenna wires and the corresponding circular centerlines 225 and 265 as a function of the azimuth angle about the circumference of the tool. Antenna 260 can be seen to be axially symmetric since the axial distance between the antenna wire and the circular centerline 265 varies substantially sinusoidally with azimuth. In the exemplary embodiment shown, the antenna tilt angle is about 45 degrees at the point at which the antenna wire crosses the circular centerline 265 (as depicted at point 270 on FIG. 3). This corresponds to an antenna having a maximum axial distance between the antenna wire and the center line of about d/4 (where d is the diameter of the tool body 210). It will be appreciated that the maximum axial distance between the antenna wire and the circular centerline 265 increases as the tilt angle increases. This results in increased transmission and reception of the transverse modes (x- and y-modes) at the expense of lengthening the antenna groove. In preferred symmetric antenna embodiments, the above-described tilt angle is in the range from about 30 to about 60 degrees.

With continued reference to FIG. 7, antenna 220 is clearly axially asymmetric (the axial distance between the antenna wire and the circular centerline 225 has rounded peaks and angular troughs). As described above with respect to FIG. 3, antenna 220 may be thought of as being bi-planar. In the exemplary embodiment shown, the antenna sections 222 and 224 are substantially orthogonal with respect to one another and have a tilt angle with an absolute value of about 45 degrees. While the invention is not limited in these regards, the relative angle between the antenna sections 222 and 224 is preferably in the range from about 60 to about 120 degrees with the absolute value of the tilt angle being in the range from about 30 to about 60 degrees.

It will be appreciated that the invention is not limited to symmetric or asymmetric antennae. Symmetric antennae are typically preferred for tool applications in which the transmission and/or reception of the axial mode and both transverse modes (x- and y-mode radiation) is desirable. In such embodiments, symmetric antennae provide for substantially symmetric transmission and/or reception of the transverse modes. Asymmetric (and in particular bi-planar) antennae are typically preferred for tool embodiments in which the transmission and/or reception of the axial mode and only a single transverse mode (x-mode radiation) is desirable.

Figure 8:
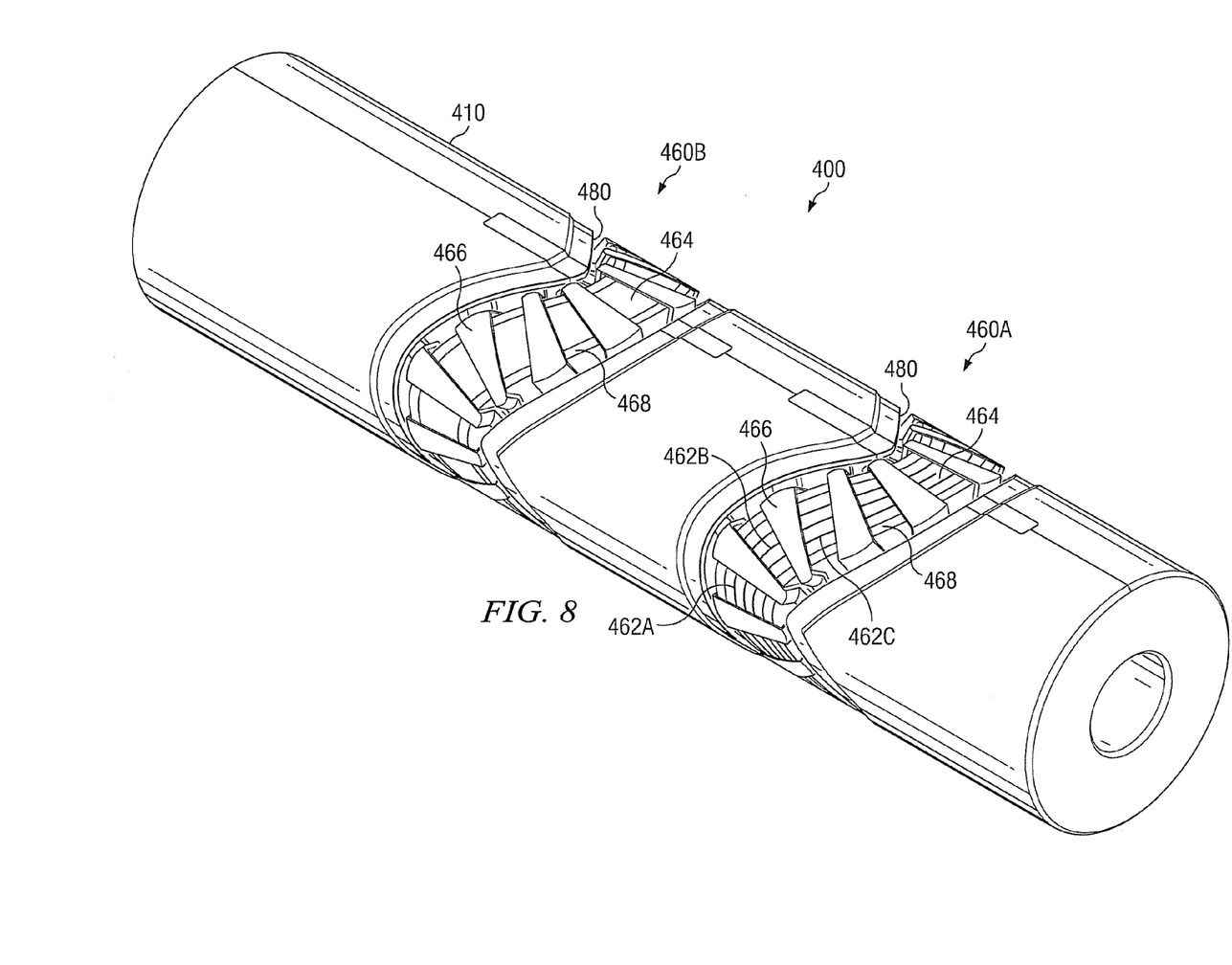
FIG. 8 depicts a portion of a logging while drilling tool including first and second non-planar antenna embodiments in accordance with the present invention.

Turning now to FIG. 8, a portion of one exemplary embodiment of a logging while drilling tool 400 including first and second axially spaced non-planar antennae 460A and 460B (collectively 460) in accordance with the present invention is depicted. As depicted, the antennae 460 are deployed in a recess 480 in the logging while drilling tool body 410. In the exemplary embodiment depicted each of the antennae 460 is configured to include three antenna wires 462A, 462B, and 462C (collectively 462) wound about and supported by a magnetically permeable magnetic material 464 (e.g., a ferrite layer). It will be readily apparent that the antenna wires 462 are only shown on antenna 460A. They are not shown on antenna 460B so that the underlying structure of exemplary antenna embodiment 460 may be more clearly portrayed. A plurality of shielding members 466 are deployed about the antenna wires 462 and are configured to protect both the antenna wire(s) 462 and the magnetic material 464. The shielding members 466 are preferably, but not necessarily, electrically insulative. In the exemplary embodiment shown, the antenna wire(s) 462 and the magnetic material 464 are embedded in an electrically insulative matrix material 468, e.g., PEEK® (polyetheretherketones).

It will be understood that the invention is not limited to embodiments employing a ferrite layer. Those of ordinary skill in the art will readily recognize that substantially any high permeability magnetic material may be utilized to enhance the transmission or reception capability of the antenna. Exemplary magnetic materials include, but are not limited to: (i) a soft ferrite material; (ii) an electrically non-conductive soft amorphous magnetic alloy; (iii) an electrically non-conductive nanocrystaline soft magnetic alloy; (iv) a stack made of soft amorphous magnetic alloy; (v) a stack made of a nanocrystaline soft magnetic alloy; (vi) a soft iron powder containing at least one of an organic and an inorganic binder; (vii) a sendust containing at least one of an organic and an inorganic binder; and (viii) a nickel iron alloy powder containing at least one of an organic and an inorganic binder.

Measurement tools in accordance with the present invention commonly include one or more digital controllers (not shown) having, for example, a programmable processor (not shown), such as a microprocessor or a microcontroller, and may also include processor-readable or computer-readable program code embodying logic, including instructions for controlling the function of the measurement tool. A suitable controller may include instructions for include determining the attenuation and/or phase shift of received radiation and for calculating and/or estimating values for the resistivity and/or dielectric constant of a formation from the attenuation and/or phase shift. Such instructions are conventional in the prior art.

A suitable controller may also be utilized, for example, to construct images of the subterranean formation based on directional formation evaluation measurements (e.g., direction resistivity measurements). In such imaging applications, directional resistivity measurements may be acquired and correlated with corresponding azimuth (toolface) measurements (obtained, for example, using azimuth sensor 130 depicted on FIG. 2) while the tool rotates in the borehole. As such, the controller may therefore include instructions for correlating directional resistivity measurements with sensor azimuth (toolface) measurements. The resistivity measurements may further be correlated with depth measurements. Directional resistivity measurements and corresponding azimuth measurements may be used to construct a borehole image using substantially any know methodologies, for example, including conventional binning, windowing, or probability distribution algorithms. U.S. Pat. No. 5,473,158 discloses a conventional binning algorithm for constructing a borehole image. Commonly assigned U.S. Pat. No. 7,027,926 discloses a technique for constructing a borehole image in which sensor data is convolved with a one-dimensional window function. Commonly assigned, co-pending U.S. patent application Ser. No. 11/881,043 ( now U.S. Pat. No. 7,558,675)describes an image constructing technique in which sensor data is probabilistically distributed in either one or two dimensions. It will be appreciated by those of ordinary skill in the art that a borehole image is essentially a two-dimensional representation of a measured formation (or borehole) parameter as a function of sensor tool face and measured depth of the borehole and that such images often enable a drilling operator to identify various formation types and bed boundaries during drilling.

A suitable controller may also optionally include other controllable components, such as sensors, data storage devices, power supplies, timers, and the like. The controller may also be disposed to be in electronic communication with various sensors and/or probes for monitoring physical parameters of the borehole, such as a gamma ray sensor, a depth detection sensor, or an accelerometer, gyro or magnetometer to detect azimuth and inclination. A controller may also optionally communicate with other instruments in the drill string, such as telemetry systems that communicate with the surface. A controller may further optionally include volatile or non-volatile memory or a data storage device.

A suitable controller typically also includes conventional circuitry utilized in transmitting and/or receiving an electromagnetic waveform. For example, the controller may include conventional circuit components such as a variable gain amplifier for amplifying a relatively weak return signal (as compared to the transmitted signal) and/or various filters (e.g., low, high, and/or band pass filters), rectifiers, multiplexers, and other circuit components for processing the return signal.

Although the present invention and its advantages have been described in detail, it should be understood that various changes, substitutions and alternations can be made herein without departing from the spirit and scope of the invention as defined by the appended claims.

I claim:
1. A downhole tool comprising:
a downhole tool body having a longitudinal axis;
a non-planar antenna deployed on the tool body, the antenna including at least one non-planar loop of antenna wire deployed about the tool body; and
at least one antenna circuit electrically connected to the antenna wire.
2. The downhole tool of claim 1, wherein the circuit is a transmitter circuit and/or a receiver circuit.
3. The downhole tool of claim 2, wherein the loop of antenna wire is electrically connected in series with the circuit.
4. The downhole tool of claim 2, wherein a first pair of circumferentially opposing points on the loop of antenna wire are electrically connected with the circuit.
5. The downhole tool of claim 4, wherein a second pair of circumferentially opposing point on the loop of antenna wire are electrically connected with the circuit.
6. The downhole tool of claim 1, wherein the non-planar loop of antenna wire is axially asymmetric with respect to a circular centerline of the antenna.
7. The downhole tool of claim 1, wherein the non-planar loop of antenna wire is axially symmetric with respect to a circular centerline of the antenna.
8. The downhole tool of claim 1, wherein the loop of antenna wire comprises first and second sections defining corresponding first and second geometric planes.
9. The downhole tool of claim 8, wherein each of the first and second sections are semi-elliptical in shape.
10. The downhole tool of claim 8 wherein the first and second geometric planes intersect one another at an angle in a range from about 60 to about 120 degrees.
11. The downhole tool of claim 8, wherein each of the first and second geometric planes intersects the longitudinal axis at an angle in a range from about 30 to about 60 degrees.
12. The downhole tool of claim 1, wherein an axial distance between the loop of antenna wire and a circular centerline of the antenna varies substantially sinusoidally with respect to an azimuth angle about a circumference of the tool body.
13. The downhole tool of claim 9, wherein the loop of antenna wire intersects the circular centerline at a tilt angle having an absolute value in a range from about 30 to about 60 degrees.
14. The downhole tool of claim 1, wherein the non-planar antenna comprises a plurality of antenna wires deployed in a single non-planar recess formed in the tool body and a corresponding plurality of antenna circuits, each of the antenna wires electrically connected to a corresponding circuit.
15. The downhole tool of claim 14, wherein:
a first antenna wire is electrically connected in series with a first circuit; and
a pair of circumferentially opposing points on a second antenna wire is electrically connected with a second circuit.
16. A downhole tool comprising:
a downhole tool body having a longitudinal axis;

a non-planar antenna deployed on the tool body, the antenna including at least one non-planar loop of antenna wire deployed about the tool body;
the loop of antenna wire including first and second sections defining corresponding first and second geometric planes; and
at least one antenna circuit electrically connected to the antenna wire.

17. The downhole tool of claim 16, wherein each of the first and second sections are semi-elliptical in shape.

18. The downhole tool of claim 16, wherein the loop of antenna wire is electrically connected in series with the circuit.

19. The downhole tool of claim 16, wherein a pair of circumferentially opposing points on the loop of antenna wire are electrically connected with the circuit.

20. The downhole tool of claim 16, wherein the antenna further comprises:
a first switch disposed to selectively connect and disconnect the loop of antenna wire in series with the circuit, said disconnecting providing a short circuit; and
a second switch disposed to selectively connect and disconnect a pair of circumferentially opposing points on the loop of antenna wire with the circuit, said disconnecting providing an open circuit.

21. The downhole tool of claim 20, wherein the antenna is configured to transceive substantially pure z-mode radiation when the first switch is connected with the circuit and the second switch is disconnected from the circuit.

22. The downhole tool of claim 20, wherein the antenna is configured to transceive substantially pure x-mode radiation when the first switch is disconnected from the circuit and the second switch is connected with the circuit.

23. The downhole tool of claim 16, wherein the antenna comprises first and second antenna wires deployed in a single non-planar recess formed in the tool body, the antenna wires electrically connected to corresponding first and second antenna circuits.

24. The downhole tool of claim 23, wherein:
the first antenna wire is electrically connected in series with the first circuit; and
a pair of circumferentially opposing points on the second antenna wire is electrically connected with the second circuit.

25. A downhole tool comprising:
a downhole tool body having a longitudinal axis;
a non-planar antenna deployed on the tool body, the antenna including at least one non-planar loop of antenna wire deployed about the tool body, the loop of antenna wire being axially symmetric about a circular centerline of the antenna;
at least one antenna circuit electrically connected to the antenna wire.

26. The downhole tool of claim 25, wherein an axial distance between the loop of antenna wire and the circular centerline varies substantially sinusoidally with respect to an azimuth angle about a circumference of the tool body.

27. The downhole tool of claim 25, wherein the loop of antenna wire is electrically connected in series with the circuit.

28. The downhole tool of claim 25, wherein first and second pairs of circumferentially opposing points on the loop of antenna wire are electrically connected with the circuit, the first and second pairs of opposing points being circumferentially spaced with respect to one another by an angle of about 90 degrees.

29. The downhole tool of claim 25, wherein the antenna further comprises:
a first switch disposed to selectively connect and disconnect the loop of antenna wire in series with the circuit, said disconnecting providing a short circuit;
a second switch disposed to selectively connect and disconnect a first pair of circumferentially opposing points on the loop of antenna wire with the circuit, said disconnecting providing an open circuit; and
a third switch disposed to selectively connect and disconnect a second pair of circumferentially opposing points on the loop of antenna wire with the circuit, said disconnecting providing an open circuit, the first and second pairs of opposing points being circumferentially spaced from one another by an angle of about 90 degrees.

30. The downhole tool of claim 29, wherein the antenna is configured to transceive substantially pure z-mode radiation when the first switch is connected with the circuit and the second and third switches are disconnected from the circuit.

31. The downhole tool of claim 29, wherein the antenna is configured to transceive substantially pure x-mode radiation when the second switch is connected with the circuit and the first and third switches are disconnected from the circuit.

32. The downhole tool of claim 29, wherein the antenna is configured to transceive substantially pure y-mode radiation when the third switch is connected with the circuit and the first and second switches are disconnected from the circuit.

33. The downhole tool of claim 25, wherein the antenna comprises first, second, and third antenna wires deployed in a single non-planar recess formed in the tool body, the antenna wires electrically connected to corresponding first, second, and third antenna circuits.

34. The downhole tool of claim 33, wherein:
the first antenna wire is electrically connected in series with the first circuit;
a pair of circumferentially opposing points on the second antenna wire are electrically connected with the second circuit; and
a pair of circumferentially opposing points on the third antenna wire is electrically connected with the third circuit, the opposing points on the second antenna wire and the opposing points on the third wire being circumferentially spaced from one another by an angle of about 90 degrees.

35. A downhole tool comprising:
a downhole tool body having a longitudinal axis;
a non-planar antenna deployed on the tool body, the antenna including first and second antenna wires deployed about the tool body in a single non-planar, circumferential recess formed in the tool body; and
the first and second antenna wires being electrically connected to corresponding first and second antenna circuits such that the first antenna wire is configured to transceive z-mode electromagnetic radiation and the second antenna wire is configured to transceive x-mode electromagnetic radiation.

36. The downhole tool of claim 35, further comprising a third antenna wire deployed about the tool body in the non-planar recess, the third antenna wire being electrically connected with a corresponding third antenna circuit such that the third antenna wire is configured to transceive y-mode electromagnetic radiation.

\* \* \* \* \*